United States Patent [19]

Kuehn et al.

[11] 4,037,328
[45] July 26, 1977

[54] SPATIAL ORIENTATION DEVICE

[75] Inventors: Lorne Kuehn, Downsview; Harold O. Seigel, Don Mills, both of Canada

[73] Assignee: Her Majesty the Queen in Right of Canada, Canada

[21] Appl. No.: 730,639

[22] Filed: Oct. 7, 1976

[30] Foreign Application Priority Data

June 2, 1976   Canada ................................. 253789

[51] Int. Cl.² .......................................... G01C 17/30
[52] U.S. Cl. ........................................ 33/349; 33/361;
340/279; 340/384 E; 340/407
[58] Field of Search ................. 33/333, 334, 347, 348,
33/355 R, 361; 340/279, 407

[56] References Cited

U.S. PATENT DOCUMENTS

| 3,210,859 | 10/1965 | Fisk et al. | 33/333 |
| 3,475,957 | 11/1967 | Hiszpanski | 33/333 |
| 3,584,388 | 6/1971 | Petrov | 33/361 |
| 3,802,088 | 4/1974 | Barrett et al. | 33/361 |

*Primary Examiner*—S. Clement Swisher
*Attorney, Agent, or Firm*—Clarence A. O'Brien; Harvey B. Jacobson

[57] ABSTRACT

A navigational device for use by underwater swimmers and divers in which a telescopically extensible boom is releasably and pivotally attached to the swimmer or diver. A compass device such as a magnetometer or fluxgate sensor is mounted at the end of the boom and is connected to an audio signal generator so that signals are generated if the swimmer deviates to either side of a predetermined course. The swimmer or diver wears a bone conduction transducer on each side of his head, which are connected to the audio signal generator via a gating device so that he can receive an audio signal, presented selectively on either side of his head, which is indicative of deviation from his predetermined course.

9 Claims, 5 Drawing Figures

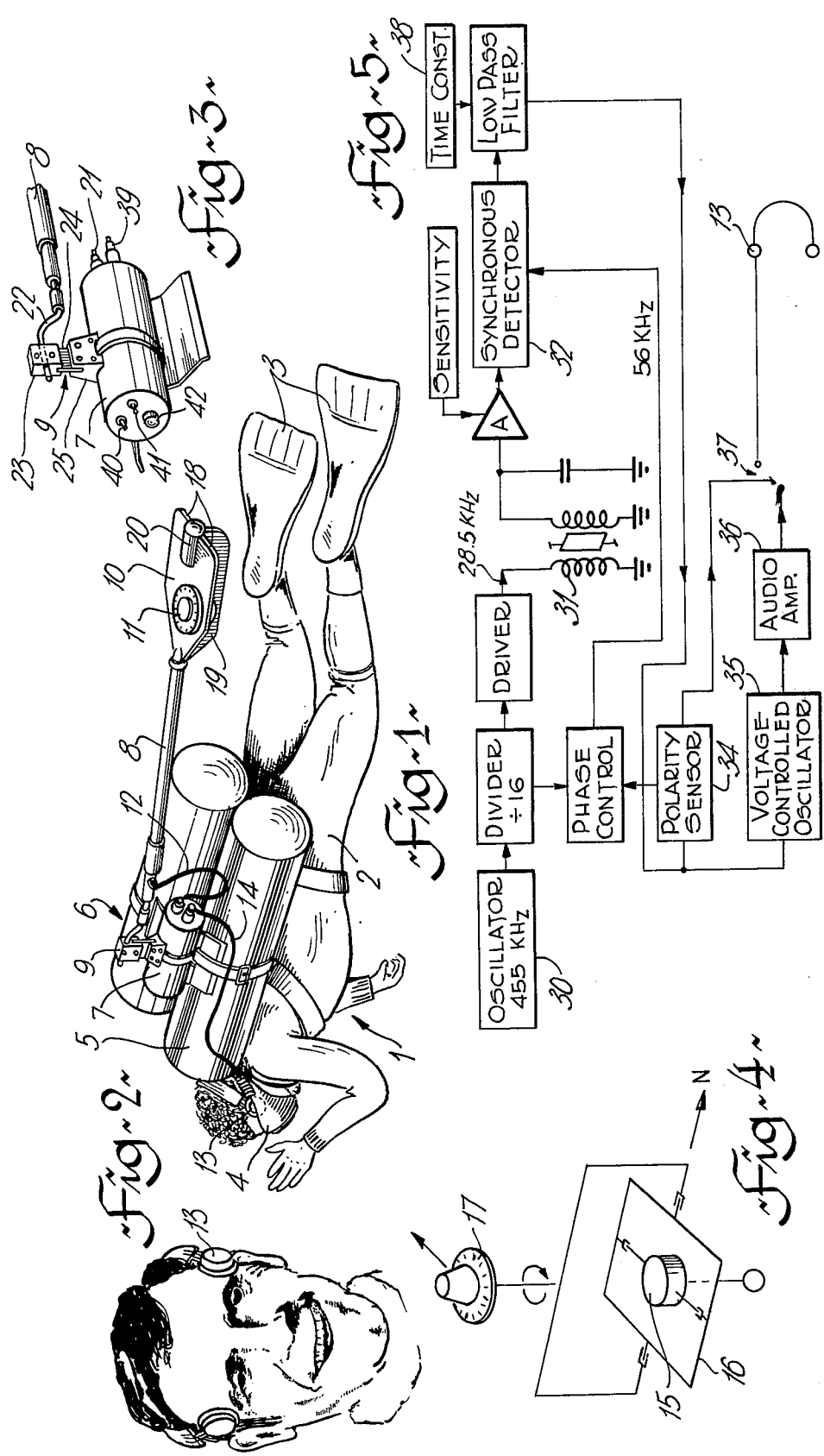

SPATIAL ORIENTATION DEVICE

This invention relates to a spatial orientation system which is specifically designed for use in an underwater environment. More specifically this invention relates to a towed direction sensing device which transmits an audio signal to an underwater swimmer or diver if he deviates from a preselected course.

In recent years rapid developments have taken place in the field of both self-contained underwater breathing apparatus (SCUBA) and the more traditional helmeted diving apparatus, so that far more use is now being made of the underwater environment for both civil and military purposes. One limiting factor is, however, the difficulty of navigation or direction sensing, particularly at night or at depths where little surface light penetrates. Swimming under ice is also particularly hazardous because of the difficulty of navigating an accurate return to the entry through the ice. Movement under ice has, heretofore, generally been restricted to relatively short distances, of the order of 200-300ft., over which the use of a safety line is practical without undue weight and mobility restriction on the diver. Distances of up to a mile or more, although well within the capability of the swimmer, have been considered hazardous because it is not possible for a swimmer to support the weight of the safety line required for such a distance, and a safety line has always been required in order to locate the entry point through the ice. Heretofore direction finding has generally been based upon the use of a visual luminescent magnetic compass which is customarily mounted on a swim board held by the swimmer or diver's hands so that the compass is visable. Not only is this undesirable because it requires the use of both hands and hence limits the swimmer's movements and actions, but it is not accurate because of inherent errors such as northerly turning error, east west acceleration error and dip errors. It is also extremely difficult for the swimmer to mantain proper orientation to the board while swimming.

It has been suggested by Barrett et al in U.S. Pat. No. 3,802,088 issued Apr. 9, 1974 and assigned to the United States Navy the problems recited hereinabove may be substantially eliminated by the use of a magnometer, which is contained in a waterproof housing and worn on an underwater swimmer's chest, which measures the strength of the earth's magnetic field, producing a proportional alternating output voltage. The phase of this voltage is compared to the phase of an alternating excitation on reference voltage to determine whether the error is to the left or right of a predetermined direction, and its signal generating means receive the error output signals and the appropriate signal is fed to a pair of earphones worn by the swimmer thereby providing an audio signal indicating the direction and magnitude of the error. Of course, when the swimmer is on his proper course no signal is received. It has been found however that the aforesaid Barrett system is not without its disadvantages and it is an object of the present invention to provide an improvement thereover.

Firstly, it has been found that the use of earphones is an underwater environment, while possible, constitutes a considerable hazard to the swimmer because of the danger of implosion or explosion thereof during descent and ascent which can easily cause permanent damage to the swimmer's hearing.

Secondly, it will be appreciated that, because of the asymetrical placing of a siwmmer's legs, a swimmer does not in fact ever swim in a straight line but rather in a series of short zig-zags each of which may be of sufficient amplitude to provide an error reading from the magnetometer.

Thirdly, a chest mounted device restricts arm movements and may impede the swimmer in the performance of his underwater assignments.

It is an object of the present invention to provide an improved spatial orientation device which seeks to overcome all of the disadvantages set forth above and which can safely be worn by both underwater swimmers using scuba equipment and divers using conventional helmet gear.

It is a further object of the present invention to provide an orientation device which does not impede the swimmer's arm movements in any way and which can be quickly released and jettisoned in the event of an emergency.

Hereinafter in this specification reference will be made only to underwater swimmers and it is to be understood that this term includes conventional helmeted divers.

Thus, by one aspect of this invention there is provided a spatial orientation system for underwater navigation comprising:

boom means for pivotal attachment to an underwater swimmer or diver;

compass means, mounted on said boom means adjacent an outboard end thereof, including means to develop an electrical voltage when deviation from a predetermined null axis occurs and which is proportional thereto;

adjustable means for setting said predetermined null axis so as to provide an initial heading;

an audible tone generating means receiving said proportional electrical voltage;

a pair of bone conduction transducers, adapted to be worn on opposite sides of the head by said swimmer or diver, receiving an output from said audible tone generating means;

gating means connected to said output of said audible tone generating means for directing the audible tone to a selected one of said transducer corresponding to deviation in one direction and to the other said transducer corresponding to deviation in the other direction, whereby said swimmer or diver receives an audible signal indicating the magnitude and direction of any deviation from the initial heading.

The invention will now be described in more detail with reference to the drawings in which:

FIG. 1 is a sketch of a swimmer towing the device of the present invention;

FIG. 2 is a sketch showing the preferred location for the bone transducers used in the present invention;

FIG. 3 is an enlarged view of the electronics container and quick release device carrying the boom of the present invention;

FIG. 4 is a sketch illustrating the operating principle of a fluxgate sensor; and FIG. 5 is a block diagram of one form of electrical circuit which may be used in the device of FIG. 2.

In order to provide the swimmer with a directional reference related to the actual or average direction of motion of the swimmer through the water rather than a directional reference merely related to the momentary orientation of his body relative to any compass direction, the direction sensing unit should be attached to but as far removed from the swimmer's body as possible, compatible with the particular tasks to be undertaken, and this can best be achieved if the direction sensor is mounted on a substantially rigid but preferably telescopically adjustable boom which is releasably and pivotally connected to the swimmers's scuba pack, as shown in FIG. 1, so that it can be towed slightly above and behind the swimmer. In FIG. 1 there is shown a swimmer 1 equipped with a conventional wet suit 2, flippers 3, face mask 4 and scuba pack 5. The orientation device, generally indicated at 6 is detachably mounted on the scuba pack 5, using any suitable strap arrangement. The orientation device 6 comprises the following components, each of which will be described in more detail hereinafter: a waterproof housing 7 containing the electronic circuitry and power supply; a telescoping boom 8; a boom-housing quick release 9; a buoyant support assembly 10; a direction sensing element 11 connected to the housing 7 by a cable 12; and a bone transducer audio generator device 13 connected to the housing 7 by a cable 14.

DIRECTION SENSING ELEMENT

The direction sensing element 11, which is preferably of the order of 5 cm diameter or less can take any one of a number of specific forms. It may be an inertial guidance system, such as a gyro compass, or may utilize a magnetic field, such as the earth's magnetic field, and thus be based on a magnetometer or compass principle. For various reasons a simple magnetic compass is not entirely satisfactory and it is preferred to employ other magnetic field detectors such as a Hall-effect sensor, magneto-diode or magneto-resistor. A particularly suitable detector is a fluxgate sensor because (a) it has a much lower power requirement than a Hall-effect element, for example, (b) it has no significant zero-field offset and (c) has a much higher intrinsic sensitivity (at least by $10^3$). A low power requirement is important so as to minimize the battery requirement to provide as light a package as possible consistent with long life. Item (b) is important in order to provide error-free return path guidance for the swimmer and item (c) is important so as to minimize the output electronics. The preferred fluxgate sensor 15, which may be as small as 1 cm diameter, is mounted on a two gimbal suspension system 16 as shown more clearly in FIG. 4 and suspended in a silicone fluid to provide good mechanical damping and minimize acceleration problems. The housing (not shown) containing the gimbals and sensor may be oriented relative to the support assembly 10 by means of a dial 17 to set any required course. It will be appreciated that correction factors for tidal drift, constant swimmer deviation (some swimmers always tend to swim more strongly to one side than to the other) and the like can easily be dialed into the course setting, thereby ensuring directional accuracy over a range of 1-2 miles. It will also be appreciated that, under certain circumstances resetting a course for the return swim from a preselected objective may not be necessary as the reciprocal of the originally set course will also provide the desired null points as will be explained more fully hereinafter.

SUPPORT ASSEMBLY

The sensor 11 is mounted on a neutral buoyancy "fish" 10 which is preferably provided with stabilizing fins 18 and a small keel 19. The buoyancy of the fish 10 is adjusted as necessary by admitting more or less water or other ballast to the buoyancy tank 20.

ADJUSTABLE BOOM

As shown in FIG. 1 the support assembly 10 is towed behind the swimmer at the end of a rigid boom 8 which is preferably hollow, non-magnetic and telescopically extensible. In operation it is preferred that the boom should be in its fully extended position so that the sensor is towed well behind the diver. In its extended position the boom is generally about 6-8 feet long, so that the device is largely out of the turbulence generated by the swimmer and well away from any incidental magnetic fields created by him, thereby minimizing "noise" in the system. The cable 12 from the sensor 11 is passed down the centre of the hollow boom 8 and is connected to the housing containing the electronics by a quick release plug 21. The boom 8 is provided with a quick-release pivotal attachment to the housing 7. In FIG. 3 there is shown a preferred form of such an attachment which comprises a short length 22 of a flexible material such as neoprene, rubber or the like, secured to a rigid block 23 having a male spade connector 24 which is resiliently and releasably engaged in a female block 25 attached to housing 7. In the event of an emergency, a pull of the order of 9 lbs is sufficient to pull spade 24 out of block 25 and disconnect plug 21, thereby allowing the boom and sensor to be jettisoned.

ELECTRONICS HOUSING

The waterproof housing 7 is releasably secured, preferably but not essentially to the swimmer's air tanks 5, by any suitable strap means, and contains the power supply and the electronic circuitry. A preferred power supply is a 9 V alkaline dry cell as this is sufficiently small and light weight yet provides an adequate reserve of power. FIG. 5 illustrates a preferred example of the electronic circuitry. The output from an oscillator 30 is connected, via a divider and driver of conventional design, to the fluxgate sensor 31 which, as indicated hereinabove, provides a means of measuring the strength of the earth's magnetic field by developing a proportionate D.C. output signal. Any deviation from a preselected orientation produces an output DC signal the polarity of which indicates the direction of deviation, clockwise or anticlockwise. This D.C. output drives a polarity sensitive gated pulse generator comprising a synchronous detector 32, a low pass filter 33, a polarity sensor 34 and a voltage controlled oscillator 35, which produces pulses whose repetition rate is related to the amount of the course deviation. After amplification (36) these pulses are then gated (37) to either the left or right bone transducers 13 to indicate the direction in which the swimmer must correct his orientation to get back on course. The threshold of the signal may be set as fine or as coarse as desired, but a design threshold of 0.5°-1° is preferred. The fluxgate output is preferably provided with a variable time constant 38 so as to provide averaging for variable time periods (e.g. 1 second to 10 seconds) to suppress short term changes in orientation associated with water turbulence or small ferrous bodies on the floor of the ocean. As previously indicated, the housing 7 and the circuitry contained therein, is connected to sensor 11 via cable 12 and a quick release plug 21. Housing 7 is also provided with a quick release plug 39 and cable 14 to bone transducers 13. Housing 7 is also provided with an on-off switch 40, a sensitivity switch 41 to select a desired sensitivity and a battery compartment access cover 42.

AUDIO GENERATOR

The output from the audio amplifier 36 is gated at 37 to either the left or right side of the head set. As previously indicated standard earphones which incorporate a gas layer to provide a vibrational medium are somewhat hazardous in an underwater environment and it is preferred that they not be used. Bone transducers are, however, extremely sensitive for this purpose and have the advantage that they can be placed at any location on the skull and not necessarily over the ears. A particularly preferred location is on the temples as shown more clearly in FIG. 2 as in this position good coupling with the bone structure is possible and the transducers can be held in place by the headband of the swimmer's mask.

In operation, the orientation device is preset for the desired course to a preselected target of destination point, taking into account such factors as swimmer deviation, swimmer speed, tidal drift and/or local currents and the like, and is then mounted on the scuba tanks 5 as shown in FIG. 1. The boom is extended as far as possible so as to avoid noise interference caused by local turbulence and the like. The swimmer then sets off on the course indicated by the null position, that is no sound in either ear. If the swimmer deviates to the left of his course a series of sound pulses will normally be heard in the left ear and the frequency of the pulses will be indicative of the magnitude of the deviation. The swimmer then adjusts his course until the null is again achieved. Similarly if deviation occurs to the right of the predetermined course sound pulses are heard in the right ear. Upon realizing the target or destination and completion of assigned tasks the orientation device can be used for the return trip without resetting of the course provided there are no complicating factors such as tidal changes or varying currents to be considered. In this ideal situation in which the effects of currents and tidal drift can be ignored, for example under ice in a freshwater lake, it is merely necessary to travel the reciprocal of the outward course and this will automatically be indicated by the compass and voltage generating means. The sound pulses will, however, be reversed and deviations to the left of course will be signalled by sounds in the right ear and vice-versa.

Other modifications and advantages of the present invention will be readily apparent to those skilled in the art, and it is to be understood that within the scope of the appended claims the invention may be practiced otherwise than as specifically described.

We claim:

1. A spatial orientation sytem for underwater navigation comprising:

boom means, for pivotal attachment to an underwater swimmer or diver;

compass means, mounted on said boom means adjacent an outboard end thereof, including means to develop an electrical voltage when deviation from a predetermined null axis occurs and which is proportional thereto;

adjustable means for setting said predetermined null axis so as to provide an initial heading;

an audible tone generating means receiving said proportional electrical voltage;

a pair of bone conduction transducers, adapted to be worn on opposite sides of the head by said swimmer or diver, receiving an output from said audible tone generating means;

gating means connected to said output of said audible tone generating means for directing the audible tone to a selected one of said transducers corresponding to deviation in one direction and to the other said transducer corresponding to deviation in the other direction, whereby said swimmer or diver receives an audible signal indicating the magnitude and direction of any deviation from the initial heading.

2. A spatial orientation device as claimed in claim 1, said boom means having stabilizing and buoyancy elements adjacent said outboard end thereof to facilitate towing by said swimmer or diver.

3. A spatial orientation system as claimed in claim 1 wherein said compass means is selected from the group comprising an inertial compass and a magnetic compass.

4. A spatial orientation device as claimed in claim 1 wherein said compass means includes magnetometer means sensing the earth's magnetic field.

5. A spatial orientation device as claimed in claim 4 wherein said magnetometer means comprises a fluxgate sensor.

6. A spatial orientation device as claimed in claim 1, wherein said means to develop said proportional electrical voltage includes battery means.

7. A spatial orientation device as claimed in claim 6 wherein said battery, said means to develop said proportional electrical voltage, said audible tone generating means and said gating means are contained in a waterproof housing adapted for attachment to said swimmer or diver.

8. A spatial orientation device as claimed in claim 7 wherein said boom means is pivotally and releasably attached and electrically connected to said waterproof housing.

9. A spatial orientation device as claimed in claim 8 wherein said boom means comprises at least two tube members telescopically interconnected.

* * * * *